(12) United States Patent
Gnessin et al.

(10) Patent No.: US 12,172,200 B2
(45) Date of Patent: Dec. 24, 2024

(54) AUTOMATED CLEANING METHODS FOR INTERNAL CAVITIES OF PRESSURE INSTRUMENTS

(71) Applicant: King Nutronics, LLC, Woodland Hills, CA (US)

(72) Inventors: Amir Gnessin, Woodland Hills, CA (US); Nathan J. Ransom, Woodland Hills, CA (US); Robert T. Welther, Woodland Hills, CA (US)

(73) Assignee: King Nutronics, LLC, Woodland Hills, CA (US)

( * ) Notice: Subject to any disclaimer, the term of this patent is extended or adjusted under 35 U.S.C. 154(b) by 0 days.

(21) Appl. No.: 17/933,019

(22) Filed: Sep. 16, 2022

(65) Prior Publication Data

US 2023/0010460 A1 Jan. 12, 2023

Related U.S. Application Data

(62) Division of application No. 16/871,337, filed on May 11, 2020, now Pat. No. 11,446,716.

(Continued)

(51) Int. Cl.
*B08B 9/032* (2006.01)
*G01L 7/04* (2006.01)

(52) U.S. Cl.
CPC .......... *B08B 9/0326* (2013.01); *B08B 9/0325* (2013.01); *G01L 7/04* (2013.01); *B08B 2209/032* (2013.01)

(58) Field of Classification Search
CPC ......... G01L 7/04–048; G01L 19/00–16; B08B 9/0321; B08B 9/0325; B08B 9/0326;

(Continued)

(56) References Cited

U.S. PATENT DOCUMENTS 2,181,730 A 11/1939 Heise
2,244,334 A 6/1941 Hopkins
(Continued)

FOREIGN PATENT DOCUMENTS

CN 201497700 6/2010
CN 205079904 * 3/2016
(Continued)

OTHER PUBLICATIONS

Google Images Search for "spring tube pressure gauge," retrieved from https://www.google.com/search?q=spring+tube+pressure+gauge (Year: 2023).*

(Continued)

*Primary Examiner* — Mikhail Kornakov
*Assistant Examiner* — Richard Z. Zhang
(74) *Attorney, Agent, or Firm* — Knobbe, Martens, Olson & Bear, LLP (57) ABSTRACT

Various automated cleaning systems for internal cavities of pressure instruments are disclosed. The systems comprise a computer controlled fluid flow system that enables the use of various cleaning fluids for cleaning internal cavities of pressure instruments to high cleanliness levels. Various pressure instruments, including complex shapes such as Bourdon tube gauges, are accommodated. The system can include a computerized cleaning cycle selection and a multi-fluid combination of cleaners for efficient and low cost cleaning solution. A servo controlled agitation system can allow for filling, evacuation, and drying of aqueous solutions as well as high performance solvents for Oxygen Clean service.

16 Claims, 5 Drawing Sheets

Related U.S. Application Data (60) Provisional application No. 62/847,072, filed on May 13, 2019.

(58) Field of Classification Search
CPC ........ B08B 9/027–057; B08B 9/00–46; B08B 9/0804–0826; B08B 3/00–14
See application file for complete search history.

(56) References Cited

U.S. PATENT DOCUMENTS

| | | | |
|---|---|---|---|
| 2,741,129 A | | 4/1956 | Linder |
| 3,364,067 A | * | 1/1968 | Piscitello .................. F28G 9/00 134/169 R |
| 3,590,641 A | | 7/1971 | Eggleston |
| 3,908,462 A | | 9/1975 | Alinari |
| 4,462,301 A | | 7/1984 | Goans |
| 4,919,154 A | * | 4/1990 | Engle .................... B08B 9/0325 134/22.12 |
| 5,011,537 A | * | 4/1991 | Voegele ................ B08B 9/0433 134/22.12 |
| 5,056,528 A | | 10/1991 | Zytkovicz et al. |
| 5,479,967 A | * | 1/1996 | Zytkovicz ............... B65B 31/02 141/331 |
| 8,454,756 B2 | | 6/2013 | Cruse |
| 11,446,716 B1 | | 9/2022 | Gnessin et al. |
| 2008/0210262 A1 | | 9/2008 | Lauzon |
| 2012/0174949 A1 | | 7/2012 | Mohrbacher et al. |
| 2014/0000654 A1 | | 1/2014 | Musante |
| 2015/0283570 A1 | | 10/2015 | West et al. |

FOREIGN PATENT DOCUMENTS

| | | | |
|---|---|---|---|
| CN | 109500027 A | | 3/2019 |
| KR | 20040016295 A | * | 2/2004 |
| SU | 1330210 A1 | * | 8/1987 |

OTHER PUBLICATIONS

Jenfab, "Sinner's Circle & Factors of the Cleaning Process," available at https://jenfab.com/blog/sinners-circle-the-4-factors-of-cleaning/ (Year: 2024).*

King Nutronics Corporation, "KNC Model 3646 Portable Instrument Cleaning System" Product Description, in 3 pages.

Manual of Water Supply Practices M66, "Cylinder and Vane Actuators and Controls—Design and Installation," American Water Works Association 2015, retrieved from https://app.knovel.com/hotlink/pdf/id:kt010RD6NF/cylinder-vane-actuators/controls, in 6 pages.

Pico, Yolanda, "8.3.3.1 In-Line, On-Line, At-Line, Off-Line Sensor Configuration," Chemical Analysis of Food—Techniques and Applications (Elsevier 2012), retrieved from https://app.knovel.com/hotlink/pdf/id:kt00BFMX71/chemical-analysis-food/in-line-line-at-line, in 4 pages.

Valin Corporation, "Solving the Burden of Bourdon Tubes," published on https://www.valin.com, 2018, in 4 pages.

* cited by examiner

Figure 1
Known Art

Figure 2
Known Art

Figure 3
Known Art

Figure 6
Known Art

AUTOMATED CLEANING METHODS FOR INTERNAL CAVITIES OF PRESSURE INSTRUMENTS

CROSS REFERENCE

This application is a divisional of U.S. patent application Ser. No. 16/871,337, filed May 11, 2020, which claims the priority benefit of U.S. Provisional Patent Application No. 62/847,072, filed May 13, 2019, the entirety of each of which is incorporated by reference herein.

BACKGROUND

Field

This disclosure generally relates to cleaning systems for pressure gauges, such as automated systems that are configured to clean Bourdon tube type pressure gauges.

Description of Certain Related Art

Pressure measurement instruments can mainly include pressure gauges and pressure transducers. Pressure gauges indicate pressure level by a mechanical pointer and a graduated faceplate. Pressure transducers convert pressure levels to electric signals. Typically, the measuring device must contact the measured fluid, whether it is gas or liquid. For example, the pressurized fluid can enter a blind cavity in the measuring device and deform a mechanical component that causes movement of a dial or deflection of an electrical sensor.

Because the instrument is usually connected to an active fluid flow, the instrument may become contaminated by impurities. For example, engine oil might introduce hydrocarbon sludge, drinking water may leave mineral sediments, and medical applications may contaminate the instruments with biohazards. Also, some contaminates may be introduced during the manufacture of the instrument, such as oil, metal chips, and solder flux.

A common pressure gauge is the Bourdon tube gauge. It includes a semicircular or otherwise bent tube that is closed at one end. The other end is connected to the measured fluid, usually by a threaded port. The Bourdon tube type gauge provides long-term consistent accuracy performance across a large range of pressure levels, from vacuum to thousands of pounds per square inch (psi).

OVERVIEW OF CERTAIN FEATURES

Many pressure gauges, such as Bourdon tube gauges, require periodic cleaning. Excessive sediment in the Bourdon tube may limit its ability to bend and therefore may affect the indicating accuracy of the gauge. Also, fluid residue that is left in the gauge may contaminate calibration equipment when the gauge is sent to the maintenance lab for periodical calibration.

A critical need for cleanliness is when the gauge will be used in oxygen service. Contaminants, such as hydrocarbons, in the gauge can increase the risk of explosion. Ideally, no contamination is left in the gauge's cavity after cleaning, so that when the gauge is returned to service the contaminants do not engage the oxygen flow. Such gauges are typically sealed in vacuum after cleaning and can be opened again in clean room environment. The cleanliness level can be measured by inspecting a final rinsing fluid introduced into the gauge. Typical oxygen cleaning procedures require cleanliness levels of not more than 5 PPM hydrocarbons left in the fluid.

A common method for gauge cleaning involves a vacuum pump for evacuation of fluids from the cavity, a selector valve, and a solvent source. At first, the selector valve connects the gauge to the vacuum source and then the operator switches the valve to the solvent line. The fresh solvent flows into the cavity until its pressure equalizes with ambient. The gauge's port is connected to a flexible hose and the operator has to manipulate the orientation of the gauge's housing to promote filling and evacuation of fluids. The process is repeated several times until the drained solvent seems clean. But, due at least to the partial vacuum that is generated by the pump, the gauge cannot be completely filled and a gas (e.g., air) bubble is typically formed inside the Bourdon tube. The air bubble prevents direct contact of the fluid with the tube's internal surface thus leaving it partially contaminated. For example, the surface area of the tube in the region of the bubble, may experience less or no contact with cleaning liquid. Due to the large size of the bubble, even movement of the bubble within the tube may not allow cleaning liquid to contact all areas of the tube. In addition, because of the manual nature of the operation, the cleaning process success is dependent on the skill and attention of the operator. Some steps, such as soaking and scrubbing, are tiring and often improperly done or skipped altogether.

Some cleaning systems were designed to use certain cleaning chemicals, such as CFC 113, that could clean effectively due to their low evaporation temperature. However, these chemicals have been banned in many places and were substituted by other cleaning chemicals, such as hydrofluoroether (HFE) fluids (e.g., Novec 71DE and 7100 offered by 3M). However, these substitute fluids are expensive. Conventional gauge cleaning systems and other laboratory setups are based on simple filling and evacuation of solvents, like the banned CFC 113 or the expensive HFE substitutes. Many experiments have been conducted in an attempt to find a cleaning solvent substitute that will clean efficiently as CFC 113 and will also be environmentally friendly and cause minimal ozone depletion effect. Most of those new solvents do not clean gauges as efficiently with existing equipment. Over the last decades there were many attempts to develop chemistry that will be equivalent in performance to the original CFC 113, however in spite of being not completely successful finding a direct substitute there was no major improvement on the equipment side that may improve the cleaning efficiency of pressure gauges.

Some cleaning techniques involve introduction of cleaning fluid into the Bourdon tube using a miniature plastic tube and/or spinning the gauge about the axis of the port. Such techniques are limited to specific gauge geometry and/or require the removal of snubbers that may be installed in the port. The snubbers may not be removable.

The geometry of the Bourdon tube can vary. It may have a "C" shape for standard applications, a spiral shape for wider pressure ranges or a complex helical shape for high resolution gauges. The common feature is that Bourdon tubes are bent about an axis. In many cases, the tube connects to the threaded port via a sharp 90° corner. Because the tube is a blind cavity (e.g., has a closed end), cleaning solution cannot be simply flushed through the gauge. In other words, the cleaning solution cannot enter one end and exit the other end of the tube. Thus, it can be a challenge to introduce cleaning solution into the gauge, clean the tube, and then completely evacuate and dry the tube from foreign materials and contaminated fluid. While a few high performance gauges may include a removable plug on the closed end of the tube for flushing purpose, such removable plugs can be difficult to manipulate and/or can introduce a point of error or failure.

The cleaning operation can be performed at a calibration lab, a gauge manufacturing facility, or even in the field where gauges are calibrated on site. The Bourdon tube is often hidden behind the faceplate inside the case of the gauge. As such, the technician that cleans the gauge may have no knowledge of the geometry (e.g., shape) of the tube. The operator may be instructed to move the gauge (e.g., raise and lower the gauge in his hand) during the filling and evacuation procedures, in the hopes that the cleaning solution will reach all corners and turns of the tube.

Some suggest making a practice tube (e.g., a glass tube) in the shape of the Bourdon tube to practice the filling and evacuation cycles of specific gauges. A rinse sample from this practice tube can be collected and tested in a spectrophotometer for traces of contamination, such as hydrocarbons. However, due to, for example, the tube geometry, presence of a bubble in the tube, nature of the cleaning solvent and contaminants, and/or cleaning procedure being operator dependent, contaminants may still be detected by the spectrophotometer test even after multiple cleaning operations of the tube. This can be frustrating and time consuming.

Many cleaning techniques require the use of cleaning solvents. Efficient cleaning solvents are expensive and have excellent cleaning ability. However, their use is not efficient when the operation involves simply filling and evacuation from the gauge. Many cleaning setups were designed to use the banned CFC 113, which is a very efficient cleaning solution, dries quickly, and is very compatible with cleanliness testing methods. However, using the same existing equipment with various substitute cleaning fluids is not always successful, especially in high cleanliness applications. Also, the solvent is evacuated from the tube and transferred into a waste flask when its cleaning potential is not utilized completely. An advantage of the HFE cleaner is its ability to evaporate completely under vacuum condition thus leaving the internal surfaces of the tube clean and dry.

Using cheaper aqueous chemicals or detergents can be a good alternative for HFE for general cleaning purpose of standard gauges or as a pre-clean cycle in "oxygen clean" application when the final rinse has to be performed by HFE. In that case, final rinse by HFE will remove any residue that might be left from the aqueous solution itself. However, there are some issues with using aqueous solutions in gauge cleaning application. For effective surface cleaning, the solution requires significantly more agitation compared to HFE solvents and usually require some heating to higher temperature in order to improve efficiency. Also, it is difficult to remove the cleaning fluid from the tube, since vacuum alone cannot evaporate aqueous solutions at room temperature as it does with HFE. Also, it was found in experiments that adding soak time to aqueous solutions while they are in the tube improves cleaning significantly.

The automated cleaning systems disclosed here solve one or more of the above problems, or other problems. The system can be for cleaning internal cavities of pressure instruments. The system can incorporate a fluid control unit that delivers and evacuates various fluids in and out of the pressure gauge, such as in a predetermined sequence while assisting the cleaning and evacuation process with agitation by fluid heating, pressure pulsation, and angular acceleration forces. Various implementations of the automated cleaning system can include at least one of, or any combination of, the following: mechanical fluid pulsation mechanism, rotating gauge mount for generating angular acceleration, multi-fluid control system that can select between cleaning and flushing and drying fluids in a sequential manner, and/or control system that can select cleaning cycles per type of gauge and a self-contained enclosure to host all the above.

The automated cleaning system can provide important benefits. For example, the automatic gauge cleaning system can enable the use of a wide range (e.g., currently approved) of cleaning solvents and aqueous solutions in an economical and efficient manner while also providing cleaning efficacy. The automatic gauge cleaning system can enable the use of various cleaning solutions in a repeatable manner with good cleanliness results. Manipulating the cleaning fluid flow by mechanical means beyond the existing vacuum pump and selector valves can beneficially increase efficiency.

The automated cleaning system can increase and/or maximizes the efficiency of one or more steps in the cleaning process. For example, filling can be improved by applying low pressure to the fluid in addition to the vacuum that pulls the fluid into the gauge. The fluid can be selectable between aqueous cleaner and solvent. Fluid heating temperature can be selectable. Operation of the system, such as soaking time, can be controlled by an electrical controller, such as a processor and memory. Agitation of the cleaning fluid can be performed by a mechanical pulsating mechanism. Additional agitation and quick fluid evacuation can be generated by a rotating stage that applies programmed angular acceleration and deceleration. Waste fluid can be directed selectively to either waste or HFE collection bottle for sampling purpose, air or other dry gas can be used for final drying of the tube while alternating repeatedly between vacuum evacuation and filling of ambient air. In various embodiments, the automated cleaning system cleans gauges better than any existing system while using commercially available cleaning fluid.

The automated cleaning system can be configured to clean an internal cavity of a pressure instrument, such as a Bourdon tube pressure gauge, pressure transducer, or otherwise. In several implementations, the cleaning system includes a housing, a mount, and a fluid system. The mount can be configured to rotate relative to the housing. The fluid system can include a manifold. The fluid system can include one or more input fluid containers and one or more output fluid containers. The input fluid containers can include, for example, an aqueous cleaner container, a water container, and a cleaning chemical container. The output fluid containers can include, for example, a used cleaning chemical container and a waste container.

The system can include one or more valves. Each of the input fluid containers and output fluid containers can be connected to the manifold via tubing and a respective one of the valves. In certain variants, one or more of the valves are solenoid valves.

The system can include a pressure pump. The pressure pump can be configured to increase the pressure within the input fluid containers. The system can have a vacuum pump. The vacuum pump can be configured to reduce the pressure within the output fluid containers.

The system can include a rotation unit, such as an electric motor, handle, or otherwise. In some embodiments, the rotation unit comprises a servo-motor.

The system can have an agitation unit, such as a motorized pulsation mechanism. In some embodiments, the agitation unit comprises a piston or a flexible bladder.

The system can have an electronic controller. The controller can be configured to control operation of the valves, pressure pump, vacuum pump, rotation unit, and/or agitation unit. Some variants include a sensor, such as a turbidity sensor. In certain variants, the sensor is communication with the controller.

The system can be configured such that, during operation of the system, a cleaning fluid from at least one of the input fluid containers flows into the internal cavity of the pressure instrument. The rotation unit can rotate the instrument relative to the housing. The agitation unit can agitate the cleaning fluid in the internal cavity. The cleaning fluid in the internal cavity of the pressure instrument can flows into at least one of the output fluid containers. The system can be configured to break a bubble in the tube into a plurality of smaller bubbles. The system can be configured to clean substantially the entire or the entire internal surface area of the internal cavity (e.g., the surface area of the inside wall of a Bourdon tube). The cleaning can include, for example, scrubbing and/or contacting with cleaning liquid.

In some embodiments, the system includes a fluid (e.g., liquid) trap. The trap can be configured to capture a sample of the cleaning fluid as it flows from the internal cavity into the at least one of the output fluid containers.

In certain variants, the system includes an ambient air inlet. The ambient air inlet can be connected to the manifold, such as via a control valve and/or a filter.

According to some implementations, the automated cleaning system, or another system, is adapted to perform a method of cleaning an internal cavity of a pressure instrument. The method can include receiving the pressure instrument in a housing. The method can include fluidly connecting the internal cavity of the pressure instrument with an input fluid container. The method can include introducing a cleaning fluid from the input fluid container into the internal cavity. The method can include rotating the pressure instrument relative to the housing, such as with a rotation unit comprising a first motor. The method can be controlled and/or performed by an electronic controller. In several implementations, the method is performed in an automated manner, such as by not requiring input and/or continuous attention from a user after the method has started (e.g., after the instrument has been installed in the housing and/or after the user has provided instructions to the controller via a control panel).

The method can include agitating the cleaning fluid in the cavity, such as with an agitation unit comprising a second motor. In some implementations, agitating the cleaning fluid in the internal cavity comprises operating a reciprocating piston or flexible bladder.

The method can include fluidly connecting the internal cavity of the pressure instrument with an output fluid container. The method can include evacuating the cleaning fluid from the internal cavity into the output container. In some implementations, the method includes breaking an air bubble in the internal cavity into a plurality of smaller air bubbles.

In some variants, the method includes introducing a rinse fluid into the internal cavity. The method can include evacuating the rinse fluid from the internal cavity into the output container.

The method can include introducing a second cleaning fluid into the internal cavity. The method can include rotating the pressure instrument relative to the housing, such as with the rotation unit (e.g., a motor or handle). The method can include agitating the second cleaning fluid in the cavity, such as with the agitation unit (e.g., a motorized mechanism). The method can include fluidly connecting the internal cavity of the pressure instrument with a second output fluid container. The method can include evacuating the cleaning fluid from the internal cavity into the second output container.

In some variants, rotating the pressure instrument relative to the housing comprises rotating the pressure instrument in clockwise and counterclockwise directions and/or accelerating and decelerating the pressure instrument. In some implementations, the method includes heating an aqueous cleaning solution, such as to approximately 50° C. The method can include assisting in the evacuation of cleaning fluid from the internal cavity and/or drying the internal cavity, such as with air.

For purposes of summarizing the disclosure, certain aspects, advantages, and features of the technology have been described herein. Not necessarily any or all such advantages are achieved in accordance with any particular embodiment of the technology disclosed herein. No aspects of this disclosure are essential or indispensable. Neither the preceding summary nor the following detailed description purports to limit or define the scope of protection. The scope of protection is defined by the claims.

BRIEF DESCRIPTION OF THE DRAWINGS

Certain features of this disclosure are described below with reference to the drawings. The illustrated embodiments are intended to illustrate, but not to limit the embodiments. Various features of the different disclosed embodiments can be combined to form further embodiments, which are part of this disclosure.

DETAILED DESCRIPTION OF CERTAIN EMBODIMENTS

Various automatic gauge cleaning systems are described. Certain embodiments of the systems are described in the context of a Bourdon tube type of pressure gauge, due to particular utility in that context. However, the embodiments and inventions disclosed herein can also be applied to rolls of other types of pressure gauges, to non-pressure gauges, and to other instruments (such as instruments having a blind cavity that receives a fluid and that is advantageous to clean). No features, structure, or step disclosed herein is essential or indispensable.

1. Pressure Gauges and Transducers

Figure 1:
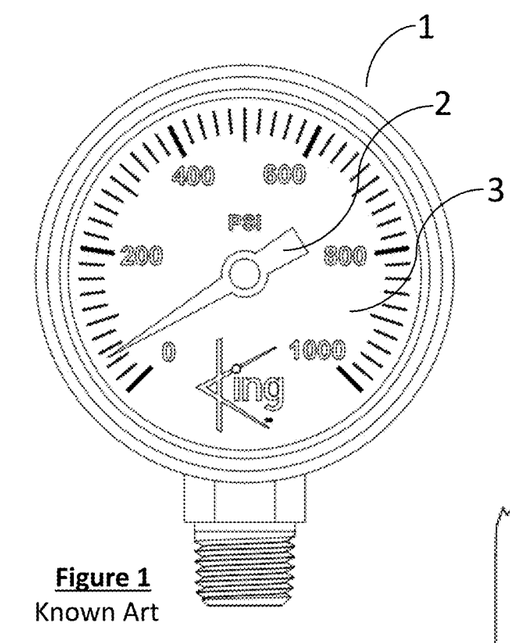
FIG. 1 illustrates a front view of a typical Bourdon tube pressure gauge.
Figure 2:
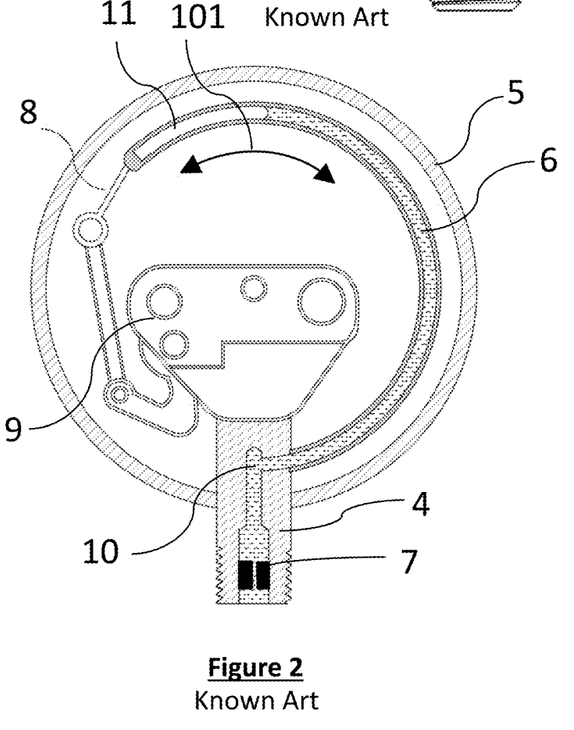
FIG. 2 illustrates a cross-sectional view from the back of the pressure gauge of FIG. 1.

FIGS. 1 and 2 illustrate an example pressure sensor 1, such as a Bourdon tube type pressure gauge. The pressure gauge can include a mechanical pointer 2 and a graduated faceplate 3. The gauge 1 can have a port 4, such as a threaded port. The gauge 1 can have an outer case 5. Internally, the gauge 1 can include the Bourdon tube 6 or other blind cavity. The tube 6 can have a fluid connection, such as an open end 10. The opposite end of the tube 6 can be a closed end 11 (also called a blind end or dead end). The tube 6 can be bent or curved, such as being semicircular, spiral, helical, or other shapes. The tube 6 can have a tube axis 101, which can extend along a longitudinal axis of the tube 6. The gauge 1 can include a snubber 7, such as in the port 4. The tube 6 can be connected to a mechanical link 8, which can be connected to a gear mechanism 9 that is joined to the pointer 2. In use, pressurized fluid can enter the gauge 1 through the port 4 and pass into the tube 6. The pressurized fluid in the tube 6 causes the tube 6 to deform, thereby moving the linkage 8, which in turn moves the indication mechanism 9 to move the pointer 2 relative to the graduated faceplate 3 to indicate the pressure of the fluid.

Figure 3:
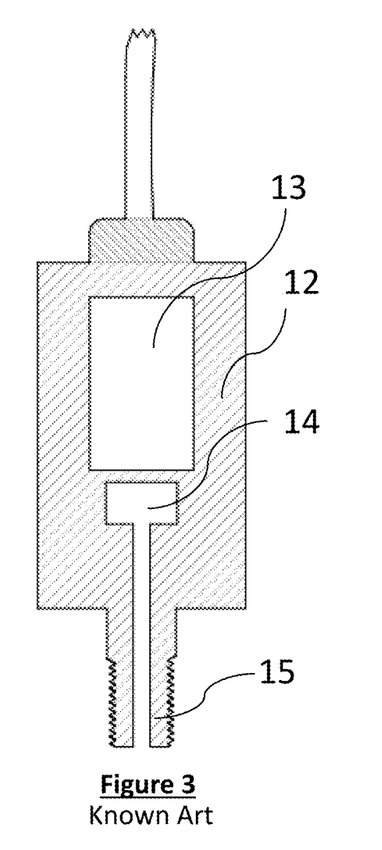
FIG. 3 illustrates a cross-sectional view of a pressure transducer.

FIG. 3 illustrates another example pressure sensor, such as a pressure transducer 12. The transducer 12 can include an electrical circuit cavity and/or an electronic sensor 13. The transducer 12 can include fluid cavity, such as a tube 14. The tube 14 can be a blind cavity and can be in fluid communication with a fluid port 15, such as a threaded port. In use, pressurized fluid can enter the tube 14. The sensor 13 can detect the pressure of the pressurized fluid. The sensor 13 can transmit a signal, such as an electronic signal, indicative of the detected pressure. The transducer 12 can include wiring to transmit the signal, such as to a controller and/or display.

In various embodiments of the pressure sensors 1, 12, the fluid can flow in and out of the tube 6, 14. In various implementations, the fluid can be and/or can include contaminants, which are desirable to clean out of the tube 6. However, because of, for example, the closed end of the tube 6, 14, the inside of the tube 6, 14 can be difficult to clean.

Figure 4:
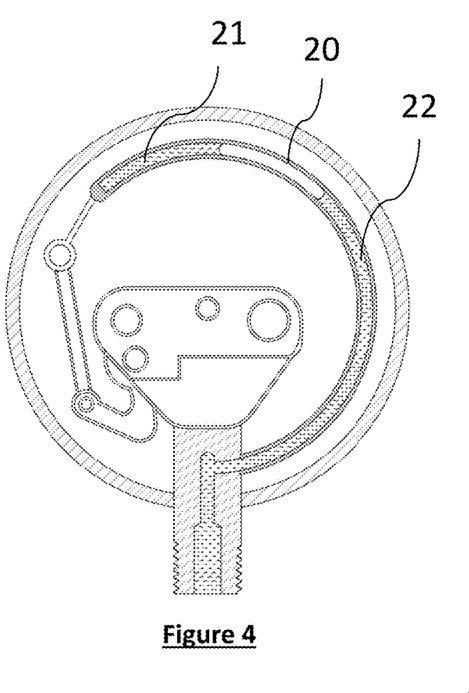
FIG. 4 illustrates a cross-sectional view of a gauge with Bourdon tube that is a partially filled with fluid.
Figure 5:
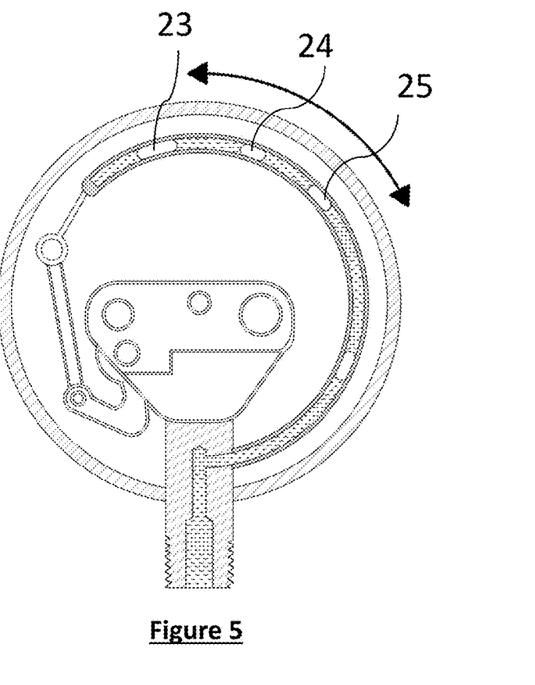
FIG. 5 illustrates a cross-sectional view of the gauge of FIG. 4 and shows an effect of rotation on the fluid inside the Bourdon tube.

When cleaning fluid (e.g., liquid) is added into the tube 6, a gas (e.g., air) bubble 20 can form. In some situations, the bubble 20 is at the closed end 11 of the tube 6 (see FIG. 2). In some other situations, a portion 21 of the cleaning fluid may be downstream of the bubble 20 and another portion 22 of the cleaning fluid may be upstream of the bubble 20 (see FIG. 4). The bubble 20 can inhibit or prevent the cleaning fluid from accessing and/or remaining in contact with portions of the inside of the tube 6, thereby enabling contaminants to remain. It would be beneficial to break up the bubble 20 into smaller gas bubbles 23, 24, 25 (see FIG. 5). This could allow liquid between the small bubbles to scrub the inside of the tube 6 as the liquid moves back and forth. Smaller bubbles can reduce or avoid issues with the large bubble, which may move without scrubbing because there will be little or no liquid in contact with portions of the tube 6.

2. Manual Cleaning System

Figure 6:
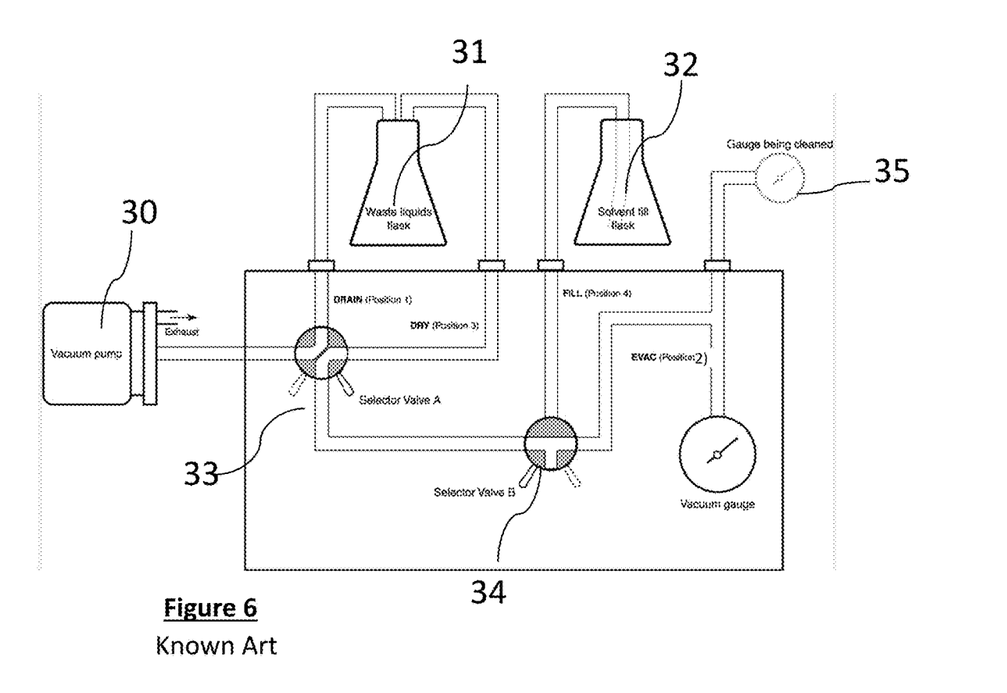
FIG. 6 illustrates a schematic of a known instrument cleaning system.

FIG. 6 illustrates, a manual cleaning system. As shown, the system can include a vacuum pump 30, a waste fluids flask, and a solvent fill flask. The system can include a four-way type selector valve 33 and a tee-type selector valve 34. The system can connect to a gauge 35 to be cleaned. The system can include King Nutronics's Portable Instrument Cleaning System, Model 3646.

3. Automatic Cleaning Systems

Figure 7:
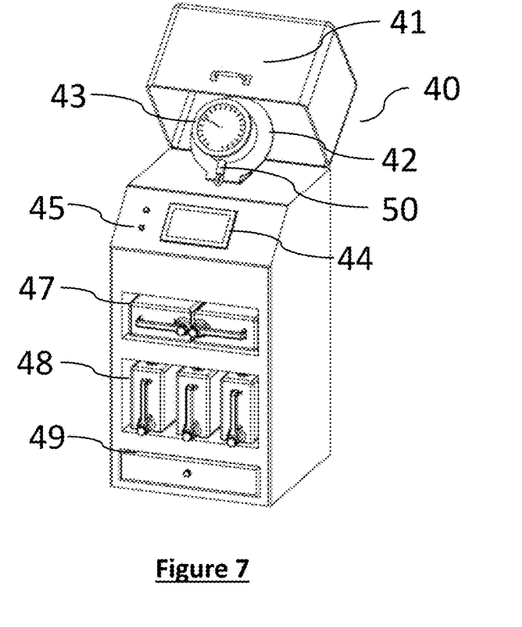
FIG. 7 illustrates an isometric view of an automatic gauge cleaning system.

FIG. 7 illustrates an automatic cleaning system 40. In some embodiments, the disclosed technology comprises an automated cleaning system for internal cavities of pressure instruments. A very high level of cleanliness is required for gauges that are used in oxygen service. Several embodiments of the automated cleaning system 40 are configured for such use.

As illustrated, the system can include a cabinet or housing. The housing can have a cover 41, such as a hinged and pivoting lid. The cover 41 can be transparent. The system 40 can include a mount 42 for gauge 43. The mount 42 can be on top of a housing. The mount 42 can be rotatable. As shown, in some embodiments, the gauge 43 can be accessed by opening the cover 41 and/or can be enclosed by closing the cover 41. The housing can support a user interface 44, such as buttons, dials, a touchscreen, etc. The user interface can be part of a control panel 45. The housing can have storage areas, such as a shelf 47 that stores containers for output fluids, such as a used cleaning chemical (e.g., FIFE) container 73 and/or waste fluid container 74. Some embodiments have a shelf 48 for input fluid containers, such as an aqueous cleaner container 75, water container 76, and/or cleaning chemical (e.g., FIFE) container 77. The housing can have a drawer 49 or other area for stowing accessories. The system 40 can be configured to be readily movable, which can be important for use in the field (e.g., to clean gauges on-site, such as on a naval ship).

The system 40 can include a connection element 46, such as a quick connect fitting. The connection element 46 can connect to the gauge 43. The connection element 46 can connect to tubing, which can be flexible. In some embodiments, the tubing is made of a material (e.g., metal or plastic) that is compatible with HFE, such as polytetrafluoroethylene (PTFE). Certain other plastics are not compatible with HFE and there is a risk that the HFE might leach some additives thus contaminating the gauge being cleaned. In some implementations, the connection element 46 comprises a fitting made of PTFE or stainless steel.

Figure 8:
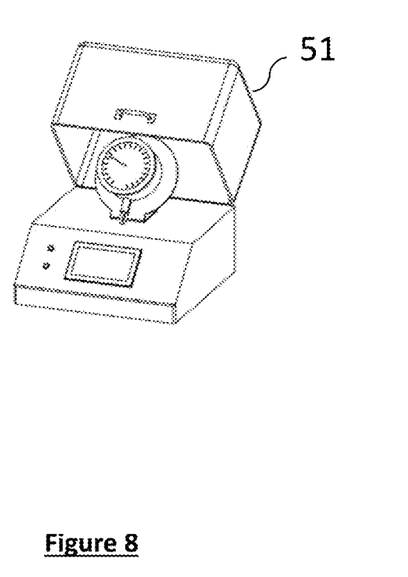
FIG. 8 illustrates an isometric view of a bench style variant of the system of FIG. 7.

FIG. 8 illustrates an automatic cleaning system 50 that is a variant of the system of FIG. 7. The system 50 can be a bench style automatic cleaning system, such as a system that is not readily movable. For example, the system 50 can be configured to be permanently mounted at a location, such as a cleaning facility. A top portion 51 of the system 50 can be mounted to a test bench while one or more of the fluid containers 73-77 can be positioned elsewhere and connected with tubes to the fluid control unit. The system 50 can include any of the features of the system 40.

Figure 9:
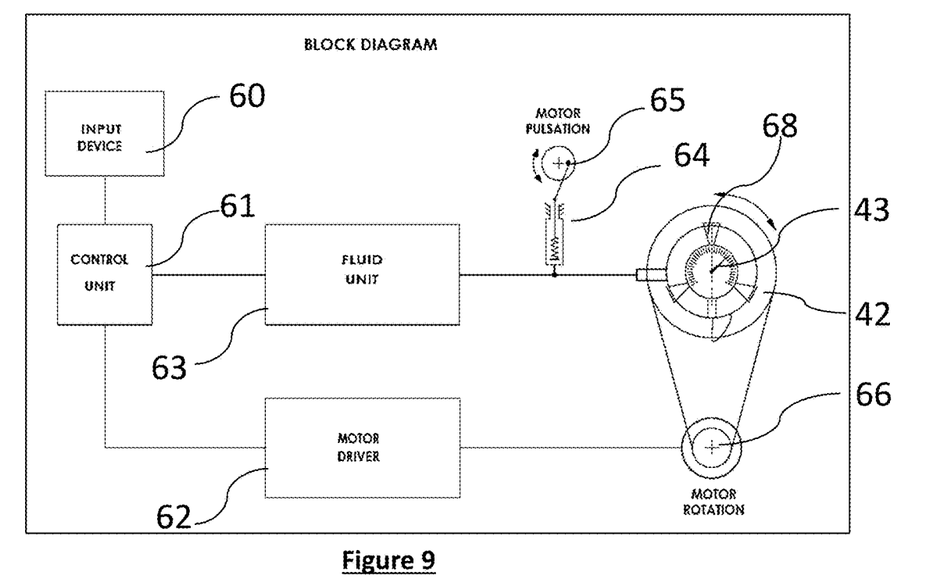
FIGS. 9 and 10 schematically illustrate embodiments of the system of FIG. 7.
Figure 10:
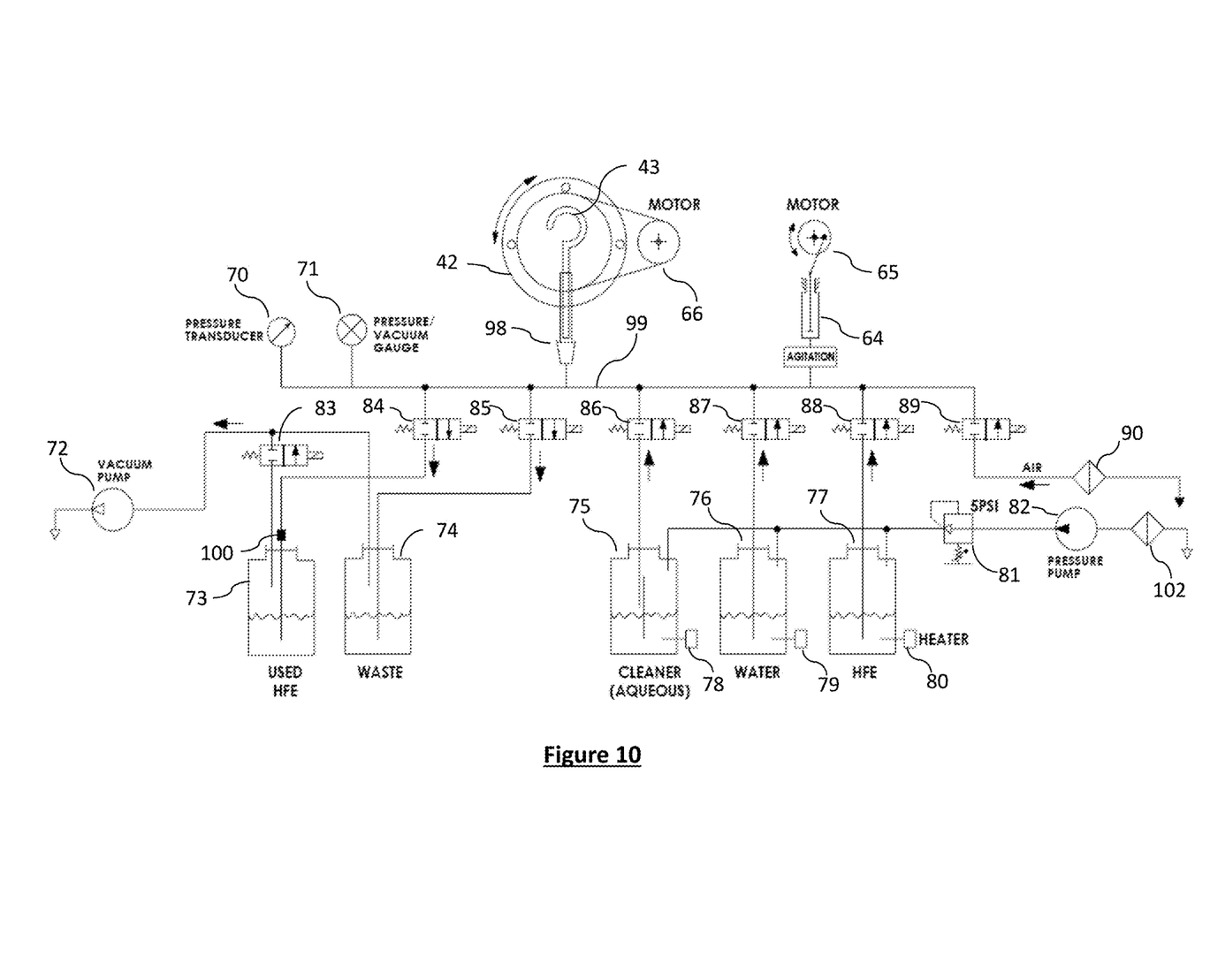
Figure 11:
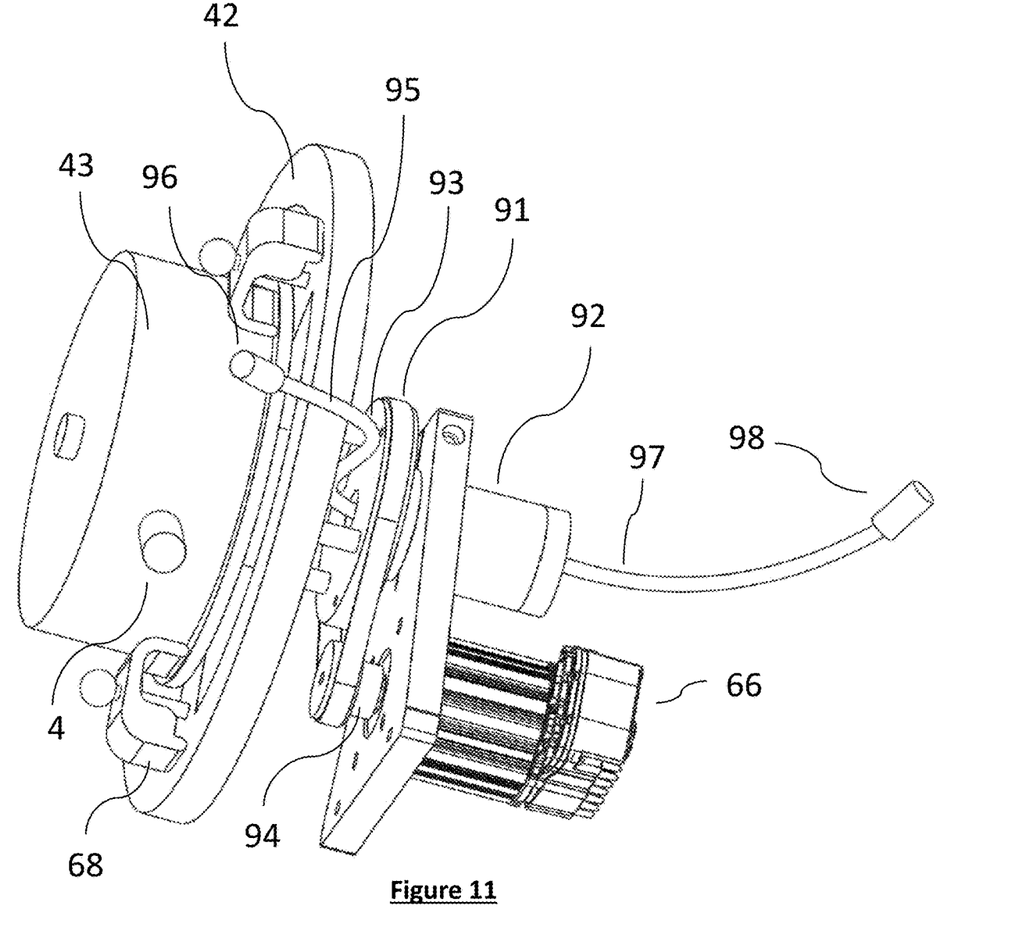
FIG. 11 illustrates an isometric view of a gauge rotation mechanism, which can be included in the system of FIG. 7.

FIGS. 9-11 illustrate certain components of the system 40, 50. The automated cleaning system can relate to an improved pressure instruments cleaning system. In several embodiments, the system can use automatic fluid flow control and gauge agitation motion controls. The cleaning system can be designed to clean many types of pressure instruments with blind cavities, such as Bourdon tube gauges and transducers. The following description will refer to Bourdon tube gauge as a gauge and other instruments as transducers.

In several implementations of the cleaning system, the gauge 43 is rotatable. The gauge 43 can be mounted (e.g., on the mount 42) and secured by a clamping device 68. The gauge 43 can be connected to a fluid flow system 63. For example, in some embodiments, a flexible tube 95 connects to the port 4 of the gauge 43 via a quick disconnect device 96. In some implementations, the flexible tube 95 connects to the fluid unit 63 via a rotation mechanism. The rotation mechanism can include a rotating union 92. The union 92 can be configured to allow for fluid passage from a rotating side (e.g., where the connector 96 interfaces with the gauge 43) to a stationary side of the mount (e.g., where the connector 98 interfaces with the manifold 99). The rotation mechanism can include flexible tube 97. The rotation mechanism can include a connector 98, such as a quick disconnect device.

In certain implementations, the rotation is driven by a motor 66. In some embodiments, the gauge mount 42 is connected (e.g., permanently) to a timing belt pulley 93, which can be driven by a smaller pulley 94 and/or a servo motor. In some embodiments, the motor 66 comprises a servo motor made by Teknic size NEMA23. In certain implementations, motive force from the motor 66 is transferred via one or more gears, such as spur gears. Some implementations include a timing belt 91, such as an XL type 120. The grooves of the timing belt 91 and pulleys 93, 94 can be about 60 and about 20 grooves respectively, or vice versa. In some variants, the rotating gauge platform can be connected to a handle and the operator can manually turn and/or jerk the gauge 43.

Operation of components of the cleaning system, such as the motor 66, can be controlled by a main control unit 61 and/or a motion driver 62. The motion driver 62 can be configured to drive the motor in specific speeds, acceleration, and deceleration rates and profiles. The control system 61 can include one or more of a programmable logic controller (PLC) (e.g., a processor and memory), human-machine interface (e.g., a touch panel display) 44, user input devices (e.g., switches) 45, power supplies, and/or relay boards.

The connector 98 can connect to a manifold 99, which can fluidly connect various components of the system 40. The manifold 99 can be located inside the fluid flow system 63. The manifold 99 can include a plurality of tubes, such as PTFE tubes. The manifold 99 can be made of a non-reactive material, such as 316 stainless steel. This can aid in making the system compatible with "Oxygen Clean" design requirements.

The manifold 99 can connect to a pressure transducer 70 and/or a pressure gauge 71. In some embodiments, the gauge 71 is a Bourdon type and/or compound pressure gauge (e.g., capable of indicating vacuum and pressure, such as a range of less than or equal to about −30 inches HG to at least about 30 psi). The gauge 71 can indicate or detect leaks in the system and/or aid in ensuring that pulsation does not exceed the maximum allowed pressure of the gauge being cleaned. In some embodiments, the pressure transducer 70 can have a range of vacuum (e.g., about −30 inch HG) to at least about 30 psi. The pressure transducer 70 can serve as a safety feature and/or can transmit detected pressure values to the PLC for an appropriate response (e.g., a shutdown if pressure exceeds a threshold amount). The transducer 70 can have electrical characteristics that meet the PLC requirements. The gauge 71 and transducer 70 can be approved to "Oxygen Clean" service and/or contain no oil internally.

The manifold 99 can connect to a pressure pulsation device 64. In various embodiments, such as is shown in FIGS. 9 and 10, the pulsation device 64 can comprise a reciprocating plunger in a tube with a closed end. The pulsation device 64 can be configured to create small pressure pulsation (such as less than or equal to about +/−5 psi), which can agitate and/or scrub the internal surfaces of the Bourdon tube cavity 6. The pulsation device 64 can be driven by a motor 65. For example, a 100-watt DC motor can drive the plunger in a reciprocating manner.

The manifold 99 can connect to a plurality of fluid control devices, such as valves 83-89. Any of the valves 83-89 can be solenoid valves. The valves 83-89 can be normally closed and/or direct acting valves. The valves 83-89 can be configured to operate in vacuum and pressure conditions. The valves 83-89 can include sealing devices inside that include PTFE. Flow through one or more of the valves 83-89 and/or tubes of the manifold 99 can be fast enough to prevent settling of contaminates along the flow passages wall, such as at least about 1 to about 2 meters per second in some variants. One or more of the valves 83-89 and/or tubes can have an internal diameter of at least about 3 mm. The valves 83-89 can have a pressure difference of at least about 15 psi. In certain embodiments, one or more of the valves 83-89 and/or tubes include ⅛" NPT ports and/or less than or equal to an internal diameter of about ⅛".

As shown in FIG. 10, the valves 84-89 can control a connection between the manifold 99 and various containers. The valve 84 connects the used cleaning chemical container 73 to the manifold 99. The valve 85 can connect the waste container 74 to the manifold 99. The valve 86 can connect the pressurized aqueous solution container 75 to the manifold 99. The valve 87 can connect the pressurized water container 76 to the manifold 99. The valve 87 can connect the pressurized water container 76 to the manifold 99. The valve 89 can connect an ambient air inlet to the manifold 99, such as through a filter 90. In some implementations, the filter is an inline filter and/or a filter 90 rated at 10 micron absolute. The filter can treat (e.g., clean) the ambient air entering into the manifold 99. As illustrated, each of the input fluid containers 75-77 and output fluid 73, 74 containers can be connected to the manifold via tubing and a respective one of the valves 84-89.

As mentioned above, the system 40 can include a plurality of fluid containers 73-77. The example shown has three input fluid containers 75-77 though other numbers are contemplated, such as 1, 2, 4, 5, or more. In some embodiments, the fluid containers 73-77 are made of material that is compatible with HFE. For example, one or more of the fluid containers 73-77 can be made of glass, such as Pyrex. The fluid containers 73-77 can have many shapes, for example, the fluid containers 73-77 can be shaped as lab flasks. The containers 73-77 can be sealed. For example, the fluid containers 73-77 can have caps that can be secured in place.

One or more of the input fluid containers 75-77 can be pressurized by a pump 82, such as air pump configured to deliver filtered air. A regulator 81 can be configured to maintain substantially constant fluid pressure. In some embodiments, the pressure regulator 81 provides a pressure of at least about 5 psi at flow rate of at least about 1 Liter/min. In some embodiments, a priming pressure (e.g., less than or equal to about 5 psi) is present in one or more of the fluid containers 75-77. The input side of the pump 82 can include a filter 102, such as a 10 micron filter. In various embodiments, the pump 82 can increase the pressure inside the containers 75-77 (e.g., relative to the manifold 99 and/or the tube 6 of the gauge 43). This can facilitate transferring fluid from the containers 75-77 into the tube 6.

One or more of the output fluid containers 73, 74 can be pressurized by a vacuum pump 72, such as a high flow vacuum pump that is capable of drawing vacuum to at least about 26 inch HG. In some implementations, the vacuum pump 72 can apply vacuum to (e.g., reduce the pressure within) the used cleaning chemical (e.g., HFE) container 73 and/or the waste containers 73, 74. In various embodiments, the pump 72 can reduce the pressure inside the containers 73, 74 (e.g., relative to the manifold 99 and/or the tube 6 of the gauge 43). This can facilitate transferring fluid from the tube 6 into the containers 73, 74. In some embodiments, fluid lines (e.g., vacuum lines) can be connected to the used HFE container 73 through the valve 83 and/or lead directly into the waste container 74. The valve 85 can connect the waste container 74, which can be under vacuum, to the manifold 99. The valve 84 can connect the used cleaning chemical container 73 to the manifold 99. The used cleaning chemical container 73 can connect and disconnect from the vacuum line by the valve 83. The used cleaning chemical container 73 can include a fluid trap 100 upstream for collecting (e.g., about 50 cc) samples for final rinse cleanliness testing. The fluid trap 100 may incorporate a turbidity sensor, such as Mettler Toledo series 8600i module. The turbidity sensor can be in communication with the control unit 61.

4. Operation of Automatic Cleaning Systems

In various embodiments, the automated cleaning systems described herein utilize automatic fluid flow control and/or fluid agitation motion controls. In some embodiments, the system 40 enables the use of multiple fluids (e.g., aqueous cleaning solution, water, cleaning chemical such as HFE, and air) in the cleaning process of internal cavities 6 of pressure gauges, such as Bourdon tube type pressure gauge, which can present some of the most difficult geometry to be cleaned.

A fluid, such as water from the container 76, can be introduced into the gauge 43. The vacuum pump 72 can be activated, thus creating vacuum in the sealed waste container 74. The valve 84 can be activated, thus connecting the waste container 74 to the manifold 99. The manifold 99 can be sealed, therefore the Bourdon tube of the gauge 43 is also under vacuum. Once the manifold 99 reaches a set amount of vacuum, the solenoid valve 87 can be activated, thus connecting the water container to the manifold 99. The set amount of vacuum can be at least about 25 inches of water. Water in the pressurized container 76 can flow into the manifold 99 and the gauge 43 due to the pressure difference between the container 76 and the manifold 99 and gauge 43. The water flow into the gauge 43 stops once the pressure in the gauge 43 equalizes with the container pressure 76. A similar fluid introduction (e.g., gauge filling) cycle can be used for the other fluid containers 78, 79.

FIG. 1 shows a typical fluid filling level inside the Bourdon tube after the introduction of fluid, such as the aforementioned introduction of water. Water flows through the port 4 and the connection 10 (e.g., 90 degree connection) into the tube 6. The air bubble 20 is formed at the distal end of the tube. The interface between air and water 16 in the tube has a meniscus shape due to the surface tension of the liquid. The size of the bubble 20 can be reduced, for example, by increasing the vacuum or pressure in the water container and/or be decreasing the fluid path volume between the valve 87 and the distal end of the tube 6.

Fluid can be evacuated from the gauge 43. The vacuum pump 72 can be activated and vacuum can be generated in the waste container 74. The valve 84 can be activated, thereby fluidly connecting the manifold 99 and the gauge 43 to the waste container 74. Some of the fluid can be evacuated from the gauge 43 due to pressure difference between the tube 11 and the waste container 74. But this may be inadequate to evacuate all of the fluid from the tube 11. Residual fluid can be removed with mechanical agitation assistance to evacuate to the tube 6, as described in more detail below.

The above cycles can be applicable to introducing (e.g., filling) and evacuating aqueous detergent solutions and cleaning chemical (e.g., FIFE) using their associated valves. However, evacuation of certain cleaning chemicals may require a different approach. For example, when HFE is used as the cleaning chemical, due to its high vapor pressure at ambient temperature, the container 73 and/or the container 77 typically needs to be sealed when not in use. In some embodiments, the valve 83 isolates the container 73 from the vacuum line so that when HFE evacuation is required then both valves 83, 84 can be activated for the duration of the evacuation. The HFE or other cleaning chemical can be collected in the container 73. This can enable the used HFE to be easily recycled by evaporation methods and permit a sample of used HFE to be analyzed for cleanliness of the gauge after the last rinse. A trap 100 can be located in-line before the cleaning chemical reaches the used container 73 to collect a small rinse sample. Certain embodiments include a turbidity sensor, such as Mettler Toledo series 8600i module. The turbidity sensor can be incorporated in the removable fluid trap. The turbidity sensor can be configured to indicate (e.g., to the controller) when the fluid is sufficiently clear and/or ready for final inspection, such as in a Total Petroleum Hydrocarbon (TPH) photo spectrometer by Buck Scientific Model HC-404.

The input fluid containers 75-77, which can be sealed, can be pressurized by the pump 82, such as an air pump. The regulator 81 can be configured to maintain substantially constant fluid pressure. Creating elevated pressure in the containers can assist with filling the Bourdon tube faster and/or reduce the size of gas bubble 20. Preferably, the pressure is relatively low, so as to avoid damage to delicate pressure instruments. In some implementations, a pressure level of less than or equal to about 5 psi is reasonable. In some embodiments, the elevated pressure can be removed by turning off the pump 82, such as via the control panel.

Any of the input fluid containers 75-77 can be equipped with heaters 78-80. The heaters 78-80 can be advantageous as some fluids require or benefit from heating. For example, heating the fluid in the aqueous cleaner container 75 may increase its efficiency. Examples of such fluids are NOC and Oakite 31 from Oakite Chemical Corporation. Certain cleaners should be warmed to around 50° C. In certain implementations, heating above around 50° C. might cause an accelerated reaction between the cleaning solution and metal surfaces of the tube. The rinsing water can be heated to about the same temperature as the aqueous cleaner to continue the cleaning operation while rinsing, assist in drying later, and/or to reduce or avoid thermal shock to the delicate instrument. In some embodiments, the heaters 78-80 can be self-regulating to a specific temperature. In some variants, a temperature control circuit can be implemented for each of the heaters 78-80 by adding a temperature sensor to the container and driving the heaters 78-80 with a control loop. In some embodiments, one or more of the heaters 78-80 can be tubular heaters, are inserted from the top, and/or a mounted from a sidewall of the containers 75-77.

Agitation can assist with introduction and evacuation of fluid into and out of the tube 6. For example, adjusting the pressure of the fluid, varying the orientation of the gauge 43 and/or shaking the gauge 43 can assist with introduction and evacuation of fluid into and out of the tube 6. The system 40 can include an agitation mechanism to provide such functionality. Certain embodiments of the system 40 have multiple (e.g., two) mechanisms that provide agitation separately and/or in combination with each other.

Some embodiments include the pressure pulsation device 64, which can be an agitation mechanism. The pressure pulsation device 64 can be connected to the manifold 99 and can be driven by a motor. The device 64 can be configured to move a piston-like plunger in a periodic manner. In some embodiments, the device 64 comprises a flexible bladder, such as a bladder that is configured to be squeezed by a user or a motorized mechanism. The result of the motion is pressure level pulsation in the manifold 99. Because the gas of the bubble 20 is much more compressible than the liquid 16, the boundary of the liquid 16 responds to the pulsation by moving periodically along the Bourdon tube axis 101. Such axial movement of the liquid inside the tube 6 generates a scrubbing operation that assists in surface contamination removal. The agitation operation can be helpful in some or every cycle that involves liquid inside the gauge 43. It can be especially useful when cleaning delicate gauges, such as gauges that cannot be rotated violently on the rotating mount 42.

Another agitation mechanism can be the rotating gauge mount 42, which can rotate the gauge 43. Rotation of the gauge 43 can beneficially affect filling and evacuation of the Bourdon tube. Without being limited by a specific theory, it is believed that the angular acceleration and deceleration breaks the bubble 20 into smaller bubbles 23-25. This can enhance cleaning efficacy and/or efficiency. For example, after breaking the large bubble into a plurality of smaller bubbles, the system can agitate and/or pulsate the pressure in the cleaning fluid in the tube 6, which can cause movement of the small bubbles along the tube axis 101. Unlike a large bubble, which may move without scrubbing because there will be no cleaning liquid in contact with certain areas the tube, the liquid between the small bubbles can scrub the tube 6 when the small bubbles move back and forth. In some variants, the system is configured (such as by breaking the large bubble into small bubbles) to scrub substantially the entire surface area of the inside of the tube 6. The scrubbing can occur, for example, at least partly because of agitated and/or pulsed cleaning liquid contacting substantially the entire surface area of the inside of the tube 6. In some embodiments, the gauge 43 is rotated in small increments and/or in a jog style motion using the motor 66. The fluid path can be directed through a rotating union 92 that enables uninterrupted flow while the mount 42 turns, regardless of direction or speed. The gauge 43 can be secured to the mount 42 with adjustable clamps 68 or other connection elements.

The motor 66 can be controlled by the motor driver 62. In some cases, the motor 66 provides substantially the same amounts of acceleration and deceleration. For example, if the goal is to simply agitate the fluid in the tube 6, then the same value can be assigned to acceleration and deceleration and the motor can be jogged in small increments in CCW and CW direction. In other cases, a different value can be assigned for acceleration and deceleration of the motor 66 via the motor driver 62. For example, if the goal is to evacuate the gauge 43, then the system 40 can rotate the gauge 43 CW only and jog in small increments when acceleration is much smaller than deceleration. The mass of the fluid sections within the tube 6 will advance gradually towards the port 10 while vacuum is also applied.

5. Certain Methods of Cleaning Internal Cavities

The present disclosure included methods of cleaning internal cavities, such as the internal cavities of pressure gauges. The method can be operated in a lab environment or as a portable unit in the field. The method can be controlled by the PLC, which can direct various operations of the system, such as operation of the valves, heaters, pumps, etc.

A first preparation step can be to fill the fluid containers 75-77 with the appropriate fluids. Aqueous solution can be selected from a list of available cleaners, such as Oakite 31, and introduced into the container 75 (e.g., a 2-gallon container). Distilled water can be introduced into the container 76 (e.g., a 2-gallon container). A cleaning chemical, such as HFE (e.g., Novec 7100), can be introduced into the container 77. In some implementations, such as certain extreme Oxygen Clean applications, the aqueous solution can be substituted with Novec 71DE that serves as pre-cleaner to be flushed with Novec 7100 later.

After the system 40 is energized (e.g., by a main power switch on the control panel 45) the system can heat the fluids in one or more of the containers 75-77, such as in about 20 minutes. The gauge 43 to be cleaned can be secured to the rotating mount 42 by adjustable clamps 68. The fluid connector 96 can be connected to the gauge port 4. Some gauges (e.g., certain gauges with rear connections) will be mounted face down with a port pointing to the front side of the system 40. The cover 41 can be lowered.

The operator can enter gauge information through the control panel 45, such as via the touch panel 44. The information can include the gauge model number or other identifying information. The system 40 can use this information (e.g., the gauge type) to choose an appropriate cleaning cycle. In some embodiments, factors that affect the selection or characteristics of a cycle can be: size (e.g., volume) of Bourdon tube, shape of tube ("C" spiral or helix), tube bend clockwise or counter clockwise, and/or pressure range. In some embodiments, the operator can choose between low, medium, and high intensity for the cleaning process (such as when identifying information is not available).

In some embodiments, the cleaning method includes activating the vacuum pump 72. Parts of the manifold 99 and/or the gauge 43 (e.g., the tube 6) can be under vacuum. The method can include opening the valve 85 and vacuuming waste. A message can be provided to the operator (e.g., "Check gauge for 26 in. Hg. Continue.").

The method can include applying the aqueous cleaner to the gauge 43. The method can include closing the valve 85 and vacuuming waste. A message can be provided to the operator (e.g., "Check gauge for 26 in. Hg. Continue"). The method can include opening the valve 86. Cleaning fluid from the container 75 can be drawn into parts of the manifold 99 and/or the gauge 43. For example, the fluid can be drawn because of a lower pressure in the manifold 99 and/or gauge 43 than in the container 75. The method can include closing the valve 86. The method can include operating the pressure pulsation device 64 and/or pulsation motor 65, such as for at least about 10 seconds. The operator can watch the gauge 71. In some embodiments, the method includes moving or varying the orientation of the gauge 43, such as by partly or fully rotating the gauge 43. The moving can be performed while the gauge 43 contains the aqueous cleaner. In some embodiments, the gauge 43 is moved with the rotation motor 66. The method can include operating the rotation motor 66 in one direction (e.g., counterclockwise) and then the other direction (e.g., clockwise) each for at least about 10 seconds. In some variants, the rotation motor 66 rotates the gauge 43 while the pulsation motor 65 drives the pulsation device 64 to agitate the fluid in the gauge 43. The method can include stopping pulsation motor 65. The method can include opening the valve 85 and vacuuming waste. For example, fluid can be drawn out of the gauge 43 and/or manifold 99 and introduced into the waste container 74. The rotation motor 66 can be stopped (e.g., after stopping of the motor 65 and/or vacuuming of waste). Any or all of the actions described in this paragraph can be performed in the order described and/or can be repeated, such as three or more times. In some embodiments, any or all of the actions are repeated until the waste fluid appears clear, such as having low turbidity. In certain variants, the controller can receive turbidity information and take action in response, such as determining whether to repeat one or more steps in the cleaning method. In some implementations, certain actions are not included, such as providing the message to the operator.

In certain implementations, the method includes rinsing the gauge 43. The method can include opening the valve 87. Water from the container 76 can be drawn into parts of the manifold 99 and/or the gauge 43. For example, the fluid can be drawn because of a lower pressure in the manifold 99 and/or gauge 43 than in the container 76. The method can include closing the solenoid valve 87. The method can include operating the pressure pulsation device 64 and/or pulsation motor 65, such as for at least about 10 seconds. In some embodiments, the method includes moving or varying the orientation of the gauge 43 while the gauge 43 contains the water. In some embodiments, the gauge 43 is moved with the rotation motor 66. The method can include operating the rotation motor 66 in one direction (e.g., counterclockwise) and then the other direction (e.g., clockwise) each for at least about 10 seconds. In some variants, the rotation motor 66 rotates the gauge 43 while the pulsation motor 65 drives the pulsation device 64 to agitate the fluid in the gauge 43. The method can include stopping the pulsation motor 65. The method can include opening the valve 85 and vacuuming waste. For example, fluid can be drawn out of the gauge 43 and/or manifold 99 and introduced into the waste container 74. The rotation motor 66 can be stopped (e.g., after stopping of the motor 65 and/or vacuuming of waste). Any or all of the actions described in this paragraph can be performed in the order described and/or can be repeated, such as three or more times. In some implementations, certain actions are not included.

The method can include a drying operation. For example, the method can include opening the valve 89, thereby allowing ambient air to enter the gauge 43 to facilitate air drying. The air can be cleaned, such as by the filter 90. The method can include closing the valve 89, such as after at least about 5 second of air drying. Any or all of the actions described in this paragraph can be performed in the order described and/or can be repeated, such as three or more times. In some implementations, certain actions are not included.

The method can include applying and/or evacuating a cleaning chemical, such as HFE. The method can include closing the valve 85 and/or vacuuming waste (e.g., into the waste container 74). The method can include opening the valve 84 and/or vacuuming fluid (e.g., cleaning chemical) in the manifold 99 and/or the gauge 43 into the used cleaning chemical container 73. The method can include opening the valve 83. In some implementations, this provides isolation. The method can include closing the valve 84. The method can include closing the valve 83. The valve 88 can be opened. Cleaning chemical from the container 77 can be drawn into parts of the manifold 99 and/or the gauge 43. For example, the fluid can be drawn because of a lower pressure in the manifold 99 and/or gauge 43 than in the container 77. The valve 83 can be closed, such as after at least about 5 seconds. The method can include operating the pressure pulsation device 64 and/or pulsation motor 65, such as for at least about 10 seconds. In some embodiments, the method includes moving or varying the orientation of the gauge 43 while the gauge 43 contains the cleaning chemical. In some embodiments, the gauge 43 is moved with the rotation motor 66. The method can include operating the rotation motor 66 in one direction (e.g., counterclockwise) and then the other direction (e.g., clockwise) each for at least about 10 seconds. In some variants, the rotation motor 66 rotates the gauge 43 while the pulsation motor 65 drives the pulsation device 64 to agitate the fluid in the gauge 43. The method can include a soak period, such as a period in which the pulsation motor 65 and/or rotation motor 66 are not operated while the gauge 43 contains the cleaning chemical. The soak period can be at least about 30 seconds. The method can include stopping the pulsation motor 65. The method can include opening the valve 83 and vacuuming waste. For example, used cleaning chemical can be drawn out of the gauge 43 and/or manifold 99 and introduced into the waste container 73. The rotation motor 66 can be stopped (e.g., after stopping of the motor 65 and/or vacuuming of waste). Any or all of the actions described in this paragraph can be performed in the order described and/or can be repeated, such as three or more times. In some implementations, certain actions are not included, such as closing the valve 85.

The method can include collecting a sample. The method can include installing the trap 100, such as inline just before the waste fluid enters the used cleaning chemical container 73. It can be desirable to position the collection trap near or immediately before the waste tank in order to catch the most recent rinse before it reaches the waste fluid and mixes with contaminated fluid. Some implementations include running at least three cycles to get reasonable clarity (e.g., low turbidity) and then using other methods like NVR (Non Volatile Residue) or TPH to perform additional testing, such as PPM level testing. The method can include drawing a sample into the trap 100. The method can include removing the trap and testing the sample (e.g., to determine whether the sample contains more than an allowable amount of contaminants). The method can include repeating any or all of the actions described in this paragraph and the preceding can be performed in the order described or otherwise, such as one or more additional times.

The method can include determining that the cleaning operation is complete and that the gauge 43 has been sufficiently cleaned. The cleaned gauge 43 can be removed from the system 40.

The method described above is an example. Many combinations contemplated can be varied based on, for example, gauge type, amount of contamination, gauge application, etc. Some cycles include fewer or additional steps. Some cycles have the steps in a different order. The method can be programmed into and/or automatically performed by the system 40, such as under the control of the PLC.

Cleaning pressure transducers or other instruments, such as flow meters and bellows type pressure gauges, can be performed in a similar manner. An adapter may be used for mounting and connecting certain types of gauges or other instruments to the system 40. Some embodiments can concurrently clean multiple (e.g., two) instruments if the instruments are stacked and connected properly. In some implementations, more than one gauge or other instrument can be connected in parallel, such as via the manifold 99. This can improve speed and/or efficiency in cleaning multiple gauges or other instruments.

6. Certain Terminology

Terms of orientation used herein, such as "top," "bottom," "horizontal," "vertical," "longitudinal," "lateral," and "end" are used in the context of the illustrated embodiment.

However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees and the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

7. Summary

The technology of the present disclosure has been discussed in the context of certain embodiments and examples. The technology extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the invention. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale is not limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of automatic cleaning systems and related methods have been disclosed. Although the automatic cleaning systems have been disclosed in the context of those embodiments and examples, the technology of this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, The following is claimed:

1. A method of cleaning an internal cavity of a pressure instrument comprising a Bourdon tube pressure gauge, the method comprising:
   mounting the pressure instrument on a rotation unit in a housing;
   fluidly connecting the internal cavity of the pressure instrument with an input fluid container;
   introducing a cleaning fluid from the input fluid container into the internal cavity;
   rotating with the rotation unit, the pressure instrument relative to the housing about an axis of rotation that passes through and is generally perpendicular to a front faceplate of the pressure instrument;
   agitating the cleaning fluid in the internal cavity;
   fluidly connecting the internal cavity of the pressure instrument with an output fluid container; and
   evacuating the cleaning fluid from the internal cavity into the output fluid container
   wherein the rotation unit comprises a rotatable mounting surface for mounting the pressure instrument thereon and a motor configured to rotate the mounting surface and the mounted pressure instrument about the axis of rotation that passes through and is generally perpendicular to the front faceplate of the pressure instrument.

2. The method of claim 1, further comprising:
   introducing a rinse fluid into the internal cavity; and
   evacuating the rinse fluid from the internal cavity into the output fluid container.

3. The method of claim 2, further comprising:
   introducing a second cleaning fluid into the internal cavity;
   rotating, with the rotation unit, the pressure instrument relative to the housing;
   agitating, with an agitation unit, the second cleaning fluid in the internal cavity;
   fluidly connecting the internal cavity of the pressure instrument with a second output fluid container; and
   evacuating the second cleaning fluid from the internal cavity into the second output fluid container.

4. The method of claim 1, further comprising breaking an air bubble in the internal cavity into a plurality of smaller air bubbles.

5. The method of claim 1, wherein rotating the pressure instrument relative to the housing comprises rotating the pressure instrument in a clockwise direction and a counterclockwise direction.

6. The method of claim 1, wherein rotating the pressure instrument relative to the housing comprises accelerating and decelerating the pressure instrument.

7. The method of claim 1, wherein agitating the cleaning fluid in the internal cavity comprises operating a reciprocating piston.

8. The method of claim 1, further comprising heating an aqueous cleaning solution.

9. The method of claim 1, further comprising drying the internal cavity with air.

10. The method of claim 1, wherein:
    agitating the cleaning fluid in the internal cavity comprises operating an agitation unit comprising a second motor.

11. The method of claim 1, wherein agitating the cleaning fluid in the internal cavity comprises pulsating the cleaning fluid in the internal cavity.

12. The method of claim 11, wherein pulsating the cleaning fluid in the internal cavity comprises:
    driving a plunger in a reciprocating manner to create pressure pulses in the cleaning fluid.

13. The method of claim 1, further comprising positively pressurizing the input fluid container with a pump.

14. The method of claim 1, further comprising positively pressurizing the input fluid container to about 5 psi.

15. The method of claim 1, wherein the rotation unit comprises a rotating union having a rotating side and a stationary side, the rotating union configured to allow the cleaning fluid to pass from the rotating side to the stationary side.

16. The method of claim 1, wherein the introducing the cleaning fluid from the input fluid container into the internal cavity occurs during the rotating the pressure instrument relative to the housing.

* * * * *

UNITED STATES PATENT AND TRADEMARK OFFICE
CERTIFICATE OF CORRECTION

PATENT NO. : 12,172,200 B2
APPLICATION NO. : 17/933019
DATED : December 24, 2024
INVENTOR(S) : Amir Gnessin Page 1 of 1

It is certified that error appears in the above-identified patent and that said Letters Patent is hereby corrected as shown below:

In the Specification

In Column 8, at Line 19, delete, "(e.g., FIFE) container" and insert --(e.g., HFE) container--.

In Column 8, at Line 23, delete "(e.g., FIFE) container" and insert --(e.g., HFE) container--.

In Column 12, at Line 3, delete "chemical (e.g., FIFE) using" and insert --chemical (e.g., HFE) using--.

Signed and Sealed this
Eleventh Day of February, 2025

Coke Morgan Stewart
*Acting Director of the United States Patent and Trademark Office*